(12) United States Patent
Chou

(10) Patent No.: US 12,519,955 B2
(45) Date of Patent: Jan. 6, 2026

(54) VIDEO ENCODER AND VIDEO DECODER

(71) Applicant: REALTEK SEMICONDUCTOR CORPORATION, Hsinchu (TW)

(72) Inventor: Kai-Hsiang Chou, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 286 days.

(21) Appl. No.: 18/196,455

(22) Filed: May 12, 2023

(65) Prior Publication Data

US 2024/0187609 A1    Jun. 6, 2024

(30) Foreign Application Priority Data

Dec. 6, 2022  (TW) .................................. 111146821

(51) Int. Cl.
*H04N 19/172*      (2014.01)
*H04N 19/46*       (2014.01)

(52) U.S. Cl.
CPC ........... *H04N 19/172* (2014.11); *H04N 19/46* (2014.11)

(58) Field of Classification Search
CPC .............................. H04N 19/172; H04N 19/46
See application file for complete search history.

(56) References Cited

U.S. PATENT DOCUMENTS

| 2003/0095306 | A1* | 5/2003 | Divelbiss | H04N 13/161 |
| | | | | 348/E13.072 |
| 2007/0291850 | A1 | 12/2007 | Ishikawa et al. | |
| 2017/0180754 | A1* | 6/2017 | Wu | H04N 19/527 |
| 2021/0192798 | A1* | 6/2021 | Lasserre | H04N 19/184 |

FOREIGN PATENT DOCUMENTS

| JP | 2005311835 A | * 11/2005 |
| WO | WO2020058956 A1 | 3/2020 |

OTHER PUBLICATIONS

Video Compression Fundamentals part 2 Pamela C Cosman.
(Continued)

*Primary Examiner* — Rowina J Cattungal
(74) *Attorney, Agent, or Firm* — WPAT, PC

(57) ABSTRACT

A video encoder and a video decoder are configured to take the variations in the third-dimensional parts of video frames into consideration. The video encoder determines how to generate compressed data of a late video frame according to a three-dimensional difference between an early video frame and the late video frame, and the video encoder includes a decision circuit and an encoding circuit. The decision circuit generates a decision result according to the three-dimensional difference between the early video frame and the late video frame. The encoding circuit performs a three-dimensional compression process to the late video frame when the decision result indicates that the three-dimensional difference satisfies a predetermined condition, and the encoding circuit performs a routine compression process to the late video frame when the three-dimensional difference does not satisfy the predetermined condition.

20 Claims, 5 Drawing Sheets

(56) References Cited

OTHER PUBLICATIONS

OA letter of a counterpart TW application (appl. No. 111146821) mailed on 2023/08/10.2) Summary of the TWOA etter issued according to the TW counterpart application:(1) Claims 1-4 and 9-10 are rejected as being unpatentable over the cited reference 1 (WO 2020/058956 A1) in view of the common technical knowledge. P.S. Correspondence between the claims of the TW counterpart application and the claims of the present US application:(1) Claims 1, 2, 3, 4, 9, and 10 of the TW counterpart application are corresponding to the claims 1, 2, 3, 4, 18, and 19 of the present.

\* cited by examiner

VIDEO ENCODER AND VIDEO DECODER

BACKGROUND OF THE INVENTION

1. Field of the Invention

The present disclosure relates to a video encoder and a video decoder, especially to a video encoder for performing video compression and a video decoder for performing video decompression.

2. Description of Related Art

Conventional video compression technologies specialize in two-dimensional processes exerted on frames and usually ignore the third-dimensional variations in frames, and thus the compression of zoom-in, zoom-out, and rotation frames consumes a lot of computing resources even though these frames are similar.

SUMMARY OF THE INVENTION

An object of the present disclosure is to provide a video encoder and a video decoder. The video encoder and the video decoder can take the third-dimensional variations in frames into consideration to greatly reduce the code size of a bitstream (i.e., data of coded frames).

An embodiment of the video encoder of the present disclosure is configured to determine how to generate compressed data of a late frame according to a three-dimensional (3D) difference between an early frame and the late frame, wherein the early frame and the late frame are two frames of successive video frames. This embodiment includes a decision circuit and an encoding circuit. The decision circuit is configured to generate a decision result according to the 3D difference between the early frame and the late frame. The encoding circuit is configured to perform a 3D compression process to the late frame when the decision result indicates that the 3D difference satisfies a predetermined condition; and the encoding circuit is further configured to perform a routine compression process to the late frame when the 3D difference does not satisfy the predetermined condition.

An embodiment of the video decoder of the present disclosure is configured to determine whether compressed data of an input frame include three-dimensional (3D) index data and accordingly determine how to generate a late frame, wherein the input frame is an early frame or the late frame. This embodiment includes a decoding circuit, a decision circuit, a frame conversion circuit, and a reconstruction circuit. The decoding circuit is configured to decompress compressed data of the early frame to generate the early frame, or is configured to use a previous frame previously generated by the video decoder as the early frame. The decision circuit is configured to determine whether the compressed data of the input frame includes the 3D index data and accordingly generate a decision result. The frame conversion circuit is coupled with the decoding circuit and the decision circuit, and is configured to generate a conversion frame according to the early frame and the 3D index data after the decision result indicates that the compressed data of the input frame includes the 3D index data. The reconstruction circuit is configured to reconstruct the late frame according to the conversion frame and compressed data of the late frame after the frame conversion circuit generates the conversion frame.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a video encoder and a video decoder. The video encoder and the video decoder are configured to take the variations in the third-dimensional parts of video frames into consideration to greatly reduce the code size of a bitstream. The video encoder and the video decoder of the present disclosure are applicable to an image frame compression/decompression device (e.g., a video codec).

In this specification: the term "two-dimension (2D)" refers to the dimension of a plane such as an xy plane composed of an X-axis and a Y-axis; the term "third dimension" refers to a dimension (e.g., the Z-axis or any axis having a non-zero included angle in relation to the plane) which is not parallel to the above-mentioned plane; and the meaning of the term "three-dimensional (3D)" includes the meaning of the term "2D" and the term "third dimension".

Figure 1:
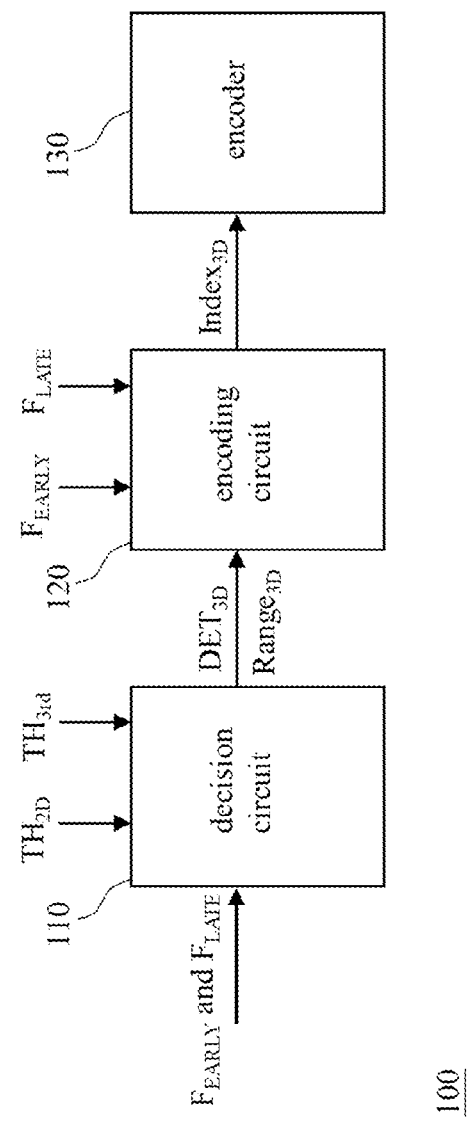
FIG. 1 shows an embodiment of the video encoder of the present disclosure.

FIG. 1 shows an embodiment of the video encoder of the present disclosure. The video encoder 100 of FIG. 1 can determine how to generate compressed data of a late frame $F_{LATE}$ (hereinafter referred to as $F_{LATE}$) according to a 3D difference between an early frame $F_{EARLY}$ (hereinafter referred to as $F_{EARLY}$) and $F_{LATE}$, wherein $F_{EARLY}$ and $F_{LATE}$ are an early video frame and a late video frame respectively, or $F_{EARLY}$ and $F_{LATE}$ are an image object of the early video frame and a corresponding image object of the late video frame respectively. The early video frame and the late video frame could be two frames (e.g., two consecutive frames or two inconsecutive frames, which are dependent upon the similarity between the two frames) of successive frames generated by a video camera (e.g., a driving recorder or a webcam), but the present invention is not limited thereto. The video encoder 100 includes a decision circuit 110, an encoding circuit 120, and an encoder 130 (e.g., a conventional encoder). The features of the present invention are mainly embodied in the decision circuit 110 and the encoding circuit 120. The encoder 130 is realized with known/self-developed technologies. The decision circuit 110 and the encoding circuit 120 are described in the following paragraphs.

As shown in FIG. 1, the decision circuit 110 is configured to generate a decision result $DET_{3D}$ according to the 3D difference between $F_{EARLY}$ and $F_{LATE}$ so as to save the encoding circuit 120 a lot of calculation. When the decision circuit 110 is going to make a decision, the decision circuit 110 performs a 3D conversion process and a 3D comparison process to a part of a video frame in conjunction with the encoding circuit 120. When the decision result $DET_{3D}$ indicates that the 3D difference satisfies a predetermined condition, the decision circuit 110 transmits the decision result $DET_{3D}$ and information of a searched range $Range_{3D}$ to the encoding circuit 120 to let the encoding circuit 120 perform a 3D compression process to $F_{LATE}$ according to the decision result $DET_{3D}$ and the information of the searched range $Range_{3D}$ as mentioned in a later paragraph. When the decision result $DET_{3D}$ indicates that the 3D difference does not satisfies the predetermined condition, the video encoder 100 performs a routine compression process (e.g., a conventional frame compression process without considering any third-dimensional variation) to $F_{LATE}$, but this falls beyond the scope of the present disclosure.

Figure 2:
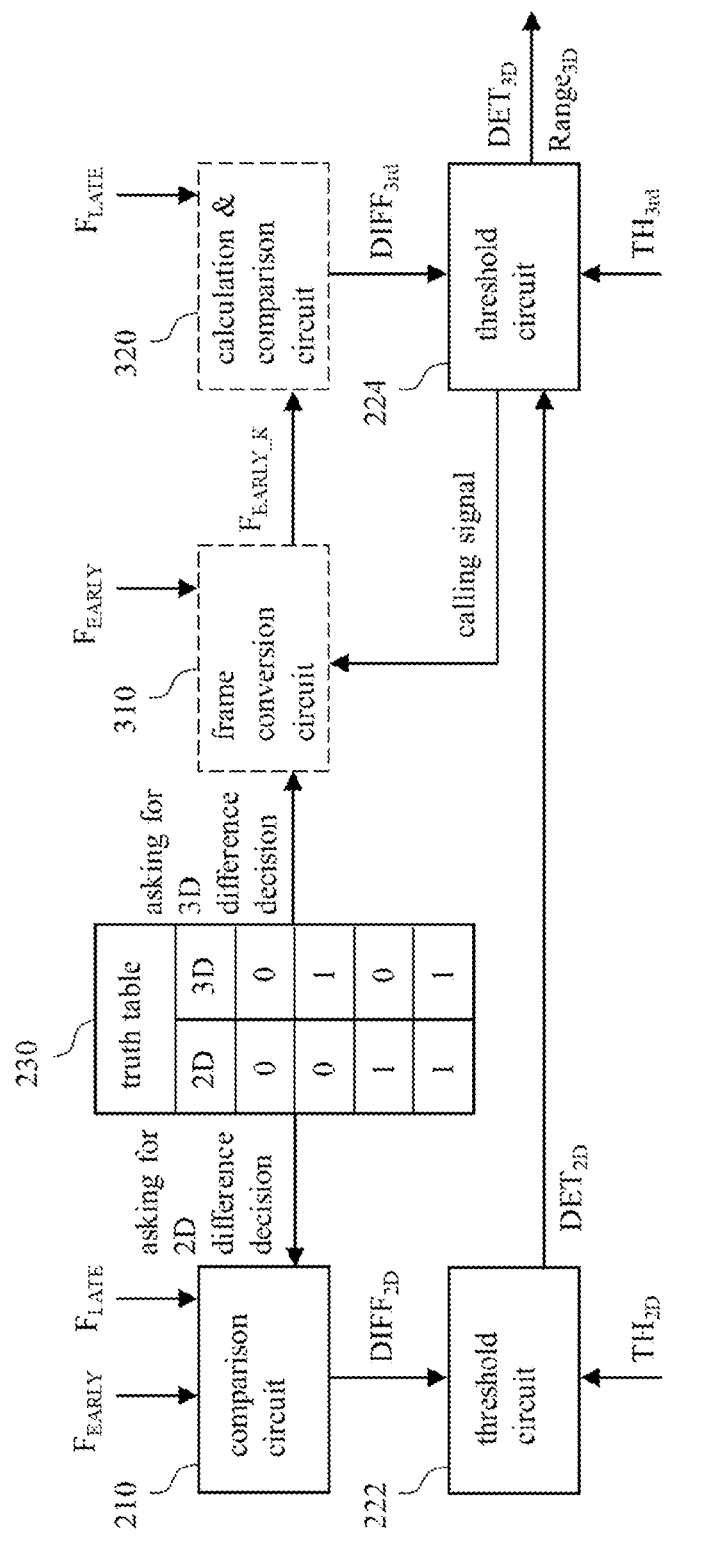
FIG. 2 shows an embodiment of the decision circuit of FIG. 1.

FIG. 2 shows an embodiment of the decision circuit 110 of FIG. 1. This embodiment includes a comparison circuit 210, a threshold circuit 222, a threshold circuit 224, and a truth table 230. Referring to FIG. 2, the circuits drawn in dashed line (i.e., the frame conversion circuit 310 and the calculation and comparison circuit 320 of the encoding circuit 120) are configured to cooperate with the decision circuit 110 and are usually not included in the decision circuit 110. Referring to FIG. 2, the decision circuit 110 is configured to determine whether a 2D difference decision and/or a 3D difference decision should be made according to a truth table 230. The content of the truth table 230 (e.g., the permutations and combinations of value "0" and value "1" of the truth table 230 in FIG. 2, wherein value "0" indicates that the 2D/3D difference decision has no need to be made and value "1" indicates that the 2D/3D difference decision needs to be made) can be determined according to implementation needs, and the operation of the truth table 230 can be realized with the arrangement of logical devices (e.g., switches). If both the 2D difference decision and the 3D difference decision should be made: the decision circuit 110 determines whether the 2D difference $DIFF_{2D}$ between $F_{EARLY}$ and $F_{LATE}$ satisfies a similarity threshold $TH_{2D}$ first; afterward, if the 2D difference $DIFF_{2D}$ satisfies the similarity threshold $TH_{2D}$, the decision circuit 110 determines whether the 3D difference $DIFF_{3rd}$ between $F_{EARLY}$ and $F_{LATE}$ satisfies a third-dimensional variation threshold $TH_{3rd}$ and accordingly generates the decision result $DET_{3D}$.

Referring to FIG. 2, when the decision circuit 110 makes the 2D difference decision, the comparison circuit 210 performs a 2D difference comparison process according to $F_{EARLY}$ and $F_{LATE}$ to obtain the 2D difference $DIFF_{2D}$, and the threshold circuit 222 determines whether the 2D difference $DIFF_{2D}$ satisfies the similarity threshold $TH_{2D}$ and accordingly generates a similarity decision result $DET_{2D}$. When the similarity decision result $DET_{2D}$ indicates that the 2D difference $DIFF_{2D}$ satisfies the similarity threshold $TH_{2D}$, the threshold circuit 224 determines whether the third-dimensional difference $DIFF_{3rd}$ satisfies the third-dimensional variation threshold $TH_{3rd}$ and accordingly generates the decision result $DET_{3D}$, which will be described later. It is noted that the comparison between two frames and the calculation of the difference between the two frames can be realized with known/self-developed technologies.

Referring to FIG. 2, when the decision circuit 110 makes the 3D difference decision with the threshold circuit 224, the decision circuit 110 generates the third-dimensional difference $DIFF_{3rd}$ with the frame conversion circuit 310 and the calculation and comparison circuit 320 of the encoding circuit 120 first, and then determines whether the third-dimensional difference $DIFF_{3rd}$ satisfies the third-dimensional variation threshold $TH_{3rd}$. When the third-dimensional difference $DIFF_{3rd}$ does not satisfy the third-dimensional variation threshold $TH_{3rd}$, the threshold circuit 224 transmits a calling signal to the frame conversion circuit 310 to request the frame conversion circuit 310 to generate a next conversion frame $F_{EARLY\_K}$, then the threshold circuit 224 determines whether the third-dimensional difference $DIFF_{3rd}$ of the next conversion frame $F_{EARLY\_K}$ satisfies the third-dimensional variation threshold $TH_{3rd}$, and the above steps are repeated until the decision result $DET_{3D}$ is generated. Regarding the information of the searched range $Range_{3D}$, the threshold circuit 224 transmits this information to the encoding circuit 120 to save the encoding circuit 120 a lot of searching time. For example, through the operation of the frame conversion circuit 310 and the operation of the calculation and comparison circuit 320, the threshold circuit 224 learns that among the conversion frames $F_{EARLY\_1} \sim F_{EARLY\_N}$, the conversion frame(s) of a small enlargement ratio (e.g., a ratio smaller than 10%) and the conversion frame(s) of a large enlargement ratio (e.g., a ratio greater than 50%) result in third-dimensional differences dissatisfying the third-dimensional variation threshold $TH_{3rd}$, and thus the threshold circuit 224 notifies the encoding circuit 120 of the above information (i.e., $Range_{3D}$) to let the encoding circuit 120 process the conversion frame(s) of a medium enlargement ratio (e.g., a ratio between 10% and 50%) and ignore the other conversion frame(s).

Please refer to FIG. 1. In a first exemplary implementation, the encoding circuit 120 generates index data $Index_{3D}$ to instruct the encoder 130 how to process $F_{EARLY}$ to generate a conversion frame $F_T$ similar to $F_{LATE}$, and the encoding circuit 120 lets the index data $Index_{3D}$ be included in the compressed data of $F_{EARLY}$ or in the compressed data of $F_{LATE}$ according to implementation needs. In a second exemplary implementation, the encoding circuit 120 obtains a remaining difference $DIFF_{RM}$ between the conversion frame $F_T$ and $F_{LATE}$ through calculation and comparison; when the remaining difference $DIFF_{RM}$ is small enough, the encoding circuit 120 replaces $F_{EARLY}$ with $F_T$ for the following video compression process. In addition, the encoding circuit 120 may call the encoder 130 (e.g., a conventional encoder) to provide the information of a code size (or a bitstream size) and use this information instead of the remaining difference $DIFF_{RM}$ as a standard for comparison. Normally, a smaller remaining difference $DIFF_{RM}$ or a smaller code size implies better compression efficiency.

Figure 3:
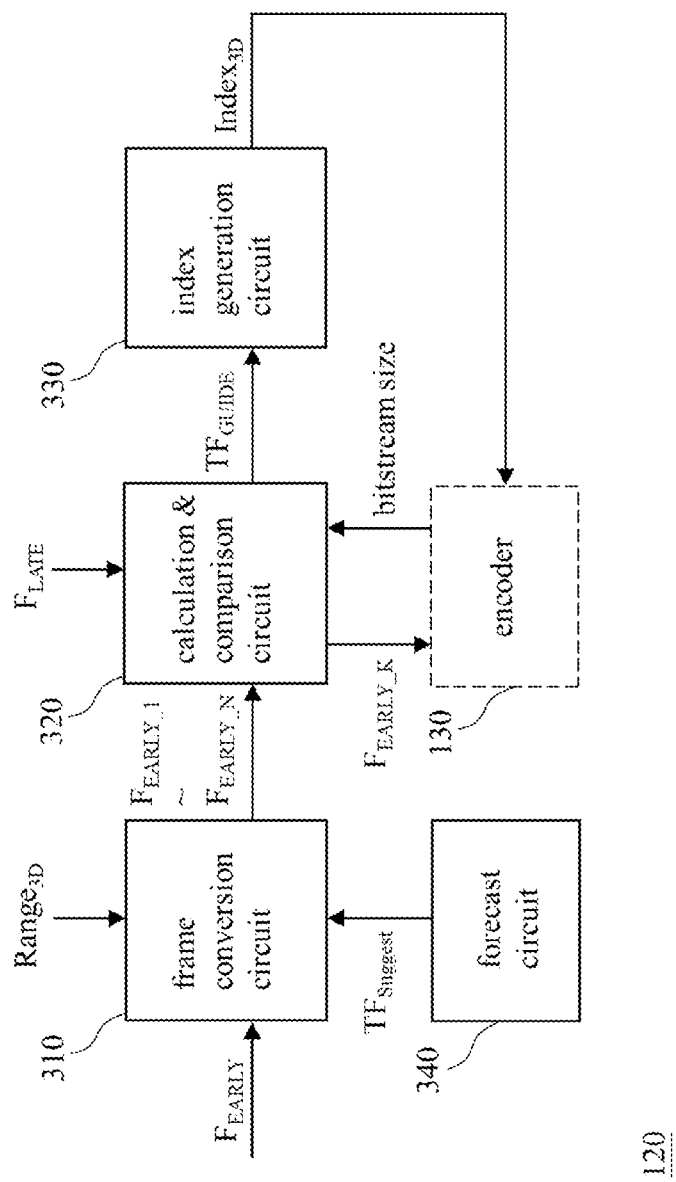
FIG. 3 shows an embodiment of the encoding circuit of FIG. 1.

FIG. 3 shows an embodiment of the encoding circuit 120 of FIG. 1. This embodiment includes a frame conversion circuit 310, a calculation and comparison circuit 320, an index generation circuit 330, and a forecast circuit 340. The embodiment of FIG. 3 is applicable to the aforementioned first and second exemplary implementations, wherein the first exemplary implementation may use the frame conversion circuit 310 and the calculation and comparison circuit 320 without using the index generation circuit 330 and the forecast circuit 340. The circuits of FIG. 3 are described in the following paragraphs.

Referring to FIG. 3, the frame conversion circuit 310 is configured to perform N type(s) of third-dimensional conversion to $F_{EARLY}$ to generate N candidate frame(s) $F_{EARLY\_1} \sim F_{EARLY\_N}$, wherein the N is a positive integer. For example, any of the N type(s) of third-dimensional conversion includes at least one of the following: a Z-axis angle conversion which is applicable in some circumstance such as a circumstance of a vehicle turning right/left or going uphill/downhill; a zoom-in/zoom-out conversion which is applicable in some circumstance such as a circumstance of a vehicle going forward/backward; a rotation conversion; and a combination of at least two of the above-mentioned conversions. For example, the N is greater than one, the N candidate frames $F_{EARLY\_1}$~$F_{EARLY\_N}$ include N1 zoom-in frames having their respective enlargement ratios, N2 zoom-out frames having their respective reduction ratios, and N3 rotation frames having their respective rotation angles, wherein each of N1, N2, and N3 is an integer greater than one and $N=N_1 \times N_2 \times N_3$. The composition (i.e., the values of N1, N2, and N3) of the N candidate frames $F_{EARLY\_1}$~$F_{EARLY\_N}$ can be determined according to implementation needs. In addition, the frame conversion circuit 310 may include a geometry conversion circuit (e.g., the geometry conversion circuit 311 in FIG. 4) for generating a certain conversion frame $F_{EARLY\_K}$ (K∈1~N) according to a conversion suggestion $TF_{Suggest}$. For example, when the conversion suggestion $TF_{Suggest}$ suggests the Z-axis should turn right by 15 degrees, the angle of elevation should be zero, the enlargement ratio should be 10%, and the rotation angle should be zero, the geometry conversion circuit generates one conversion frame $F_{EARLY\_K}$ based on the above-mentioned suggestion.

Referring to FIG. 3, the calculation and comparison circuit 320 is configured to compare each of the N candidate frame(s) $F_{EARLY\_1}$~$F_{EARLY\_N}$ with $F_{LATE}$ to find out which of the N candidate frame(s) $F_{EARLY\_1}$~$F_{EARLY\_N}$ analogous to the conversion frame $F_T$ and thereby generate conversion guidance $TF_{GUIDE}$, wherein the conversion guidance $TF_{GUIDE}$ indicates how to process $F_{EARLY}$ (e.g., how to scale up, scale down, or rotate $F_{EARLY}$) to obtain the conversion frame $F_T$. Normally, the candidate frame that is most similar to $F_{LATE}$ is used as the conversion frame $F_T$. For example, when the remaining difference $DIFF_{RM}$ between a candidate frame $F_{EARLY\_K}$ (K∈1~N) and $F_{LATE}$ is the minimum difference, this candidate frame $F_{EARLY\_K}$ is deemed the frame most similar to $F_{LATE}$. In the decision circuit 110, the threshold circuit 224 only needs to determine whether $DIFF_{RM}$ (i.e., $DIFF_{3rd}$) is smaller than $TH_{3rd}$ according to the output of the calculation and comparison circuit 320. In the encoding circuit 120, the calculation and comparison circuit 320 needs to choose the optimum candidate frame $F_{EARLY\_K}$ from the N candidate frame(s) $F_{EARLY\_1}$~$F_{EARLY\_N}$, wherein the optimum candidate frame $F_{EARLY\_K}$ takes the place of $F_{EARLY}$ and is provided for the encoder 130 to let it generate coded data of $F_{LATE}$ according to $F_{EARLY\_K}$. The said optimum candidate frame $F_{EARLY\_K}$ may be a frame chosen under limited calculation resources, or may be a qualified frame meeting predetermined conditions.

Referring to FIG. 3, the index generation circuit 330 is configured to generate the index data $Index_{3D}$ according to the conversion guidance $TF_{GUIDE}$. In an exemplary implementation, the index data Index3D are included in a field of user data of a conventional coded video bitstream or an extension filed of the conventional coded video bitstream, wherein the bitstream is transmitted to a video decoder (e.g., the video decoder 500 in FIG. 5). It is noted that the frame conversion circuit 310 may use $F_{EARLY}$ and optionally use at least one frame earlier than $F_{EARLY}$ and/or at least one frame later than $F_{EARLY}$ when performing the N type(s) of third-dimensional conversion, especially the zoom-in conversion and rotation conversion, and thereby generate the N candidate frame(s) $F_{EARLY\_1}$~$F_{EARLY\_N}$. It is also noted that the Z-axis angle conversion, the zoom-in conversion, the zoom-out conversion, and the rotation conversion mentioned in the preceding paragraph can be realized with known/self-developed technologies. Since the present invention does not focus on these conversions, their detail is omitted here.

Figure 4:
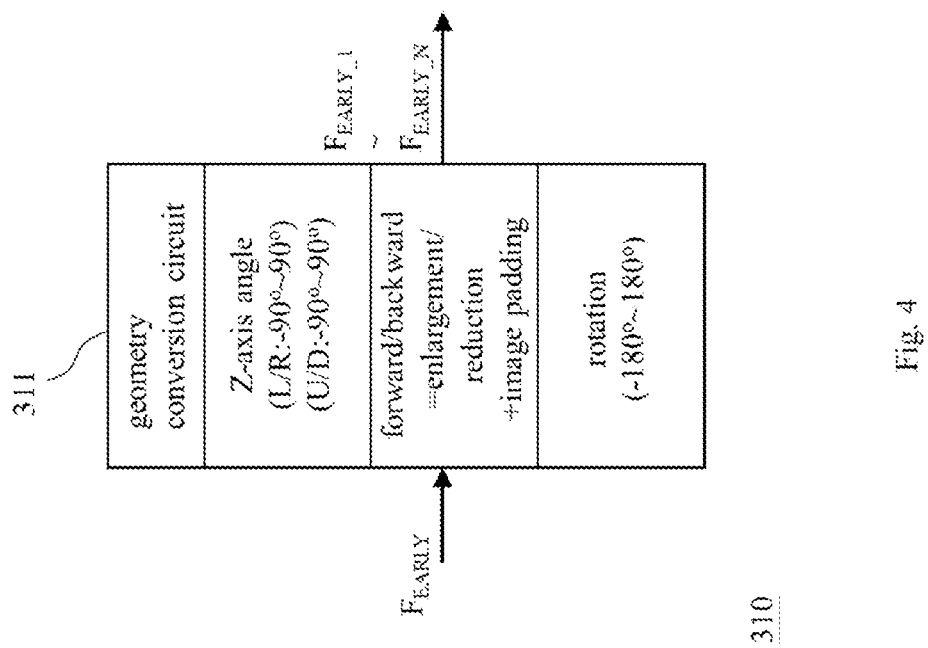
FIG. 4 shows an embodiment of the frame conversion circuit of FIG. 3.

FIG. 4 shows an embodiment of the frame conversion circuit 310 of FIG. 3. This embodiment includes a geometry conversion circuit 311. The geometry conversion circuit 311 includes at least the following functions: the Z-axis angle conversion; the zoom-in/zoom-out conversion; and the rotation conversion. The Z-axis angle conversion takes the X-axis and the Y-axis variations in frames into consideration simultaneously, wherein the range of each of the X-axis and the Y-axis variations is between 90 degree and −90 degree (i.e., "L/R: −90°~90°" and "U/D: −90°~90°" in FIG. 4, wherein "L/R" denotes "left/right" and "U/D" denotes "uphill/downhill"). The zoom-in/zoom-out conversion can be represented with a percentage of $F_{EARLY}$, and the effect of this conversion can be enhanced by the image padding of other video frames. The variation range of the rotation conversion is between 180 degree and −180 degree. $F_{LATE}$ could be equivalent to "$F_{EARLY}$ undergoing at least two of the above-mentioned conversions". For example, $F_{LATE}$ could be equivalent to "$F_{EARLY}$ undergoing the zoom-out conversion without the Z-axis angle conversion and/or the rotation conversion".

Referring to FIG. 3, the forecast circuit 340 is configured to provide a conversion suggestion $TF_{Suggest}$ for the frame conversion circuit 310. Generally, in consideration of timeliness and the difficulty of information acquisition, the video encoder 100 may not figure out what type of geometry conversion of $F_{EARLY}$ is equivalent to $F_{LATE}$, and may use the nonoptimal frame $F_{EARLY\_K}$ as the conversion frame $F_T$ for the following encoding process, which sacrifices the code size of encoded data but reduces the amount of calculation. Fortunately, regarding transportation vehicles, remote control vehicles, and unmanned flying vehicles, the uphill/downhill angle, the steering angle of a steering wheel or a roll angle, and the cruise speed are usually known or accessible information, and thus the forecast circuit 340 can provide a conversion suggestion $TF_{Suggest}$ analogous to the conversion guidance $TF_{Guide}$ or provide a conversion suggestion $TF_{Suggest}$ as a part of the conversion guidance $TF_{Guide}$ based on the above-mentioned information. The conversion suggestion $TF_{Suggest}$ indicates $F_{LATE}$ is equivalent/similar to what type of geometry conversion of $F_{EARLY}$ and thereby accelerates the frame conversion circuit 310 in calculation. In addition, the forecast circuit 340 may perform a comparison process without using the calculation and comparison circuit 320, and may instruct the frame conversion circuit 310 to generate "the $K^{th}$ type of geometry conversion of $F_{EARLY}$" (i.e., $F_{EARLY\_K}$) as the conversion frame $F_T$ according to the steering angle, the cruise speed, etc.

Figure 5:
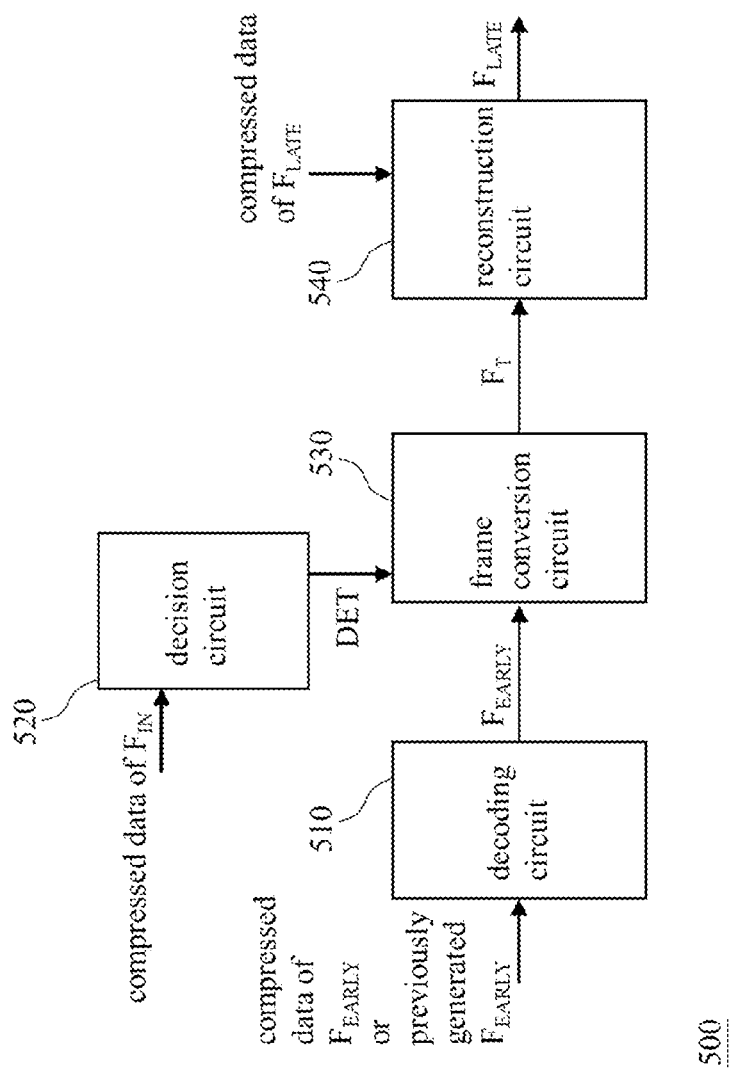
FIG. 5 shows an embodiment of the video decoder of the present disclosure.

FIG. 5 shows an embodiment of the video decoder of the present disclosure. The video decoder 500 of FIG. 5 can determine whether the compressed data (e.g., a video bitstream) of an input frame $F_{IN}$ include 3D index data (hereinafter referred to as "3D_Index") (e.g., the aforementioned index data $Index_{3D}$) and thereby determine how to generate a late frame $F_{LATE}$ (hereinafter referred to as "$F_{LATE}$"), wherein the input frame $F_{IN}$ is an early frame $F_{EARLY}$ (hereinafter referred to as "$F_{EARLY}$") or a reconstructed frame (i.e., a preceding $F_{LATE}$ instead of the to-be-generated $F_{LATE}$) reconstructed previously. The video decoder 500 includes a decoding circuit 510, a decision circuit 520, a frame conversion circuit 530, and a reconstruction circuit 540. These circuits are described in the following paragraphs.

Referring to FIG. 5, the decoding circuit 510 is configured to decode the compressed data of $F_{EARLY}$ to generate $F_{EARLY}$, or configured to use a previous frame (i.e., $F_{EARLY}$ that has been generated previously) generated by the video decoder 500 before as $F_{EARLY}$. For example, when $F_{EARLY}$ is the first frame of successive frames, the decoding circuit 510 decompresses the compressed data of $F_{EARLY}$ to generate $F_{EARLY}$; and when $F_{EARLY}$ is the $K^{th}$ (K≥2) frame of the successive frames, the decoding circuit 510 decompresses the compressed data of $F_{EARLY}$ to generate $F_{EARLY}$ or the decoding circuit 510 uses the previous frame as $F_{EARLY}$ provided that the video decoder 500 has generated the previous frame. In an exemplary implementation, the video decoder 500 generates the $K^{th}$ frame (i.e., $F_{EARLY}$) according to the $(K-1)^{th}$ frame, wherein the $K^{th}$ frame and the $(K-1)^{th}$ frame are two consecutive frames.

Referring to FIG. 5, the decision circuit 520 is configured to determine whether the compressed data of the input frame $F_{IN}$ includes 3D_Index and accordingly generate a decision result DET. When the decision result DET indicates that the compressed data of the input frame $F_{IN}$ includes 3D_Index, the video decoder 500 generates $F_{LATE}$ with the frame conversion circuit 530 and the reconstruction circuit 540. When the decision result DET indicates that the compressed data of the input frame $F_{IN}$ does not include 3D_Index, the video decoder 500 performs a routine decompression process (e.g., a conventional decompression process) to generate $F_{LATE}$, which can be realized with known/self-developed technologies and falls beyond the scope of the present disclosure. It is noted that when the input frame $F_{IN}$ is $F_{EARLY}$ rather than the preceding $F_{LATE}$, the decision circuit 520 has no need to wait for the compressed data of the preceding $F_{LATE}$ so that the whole decoding process can be accelerated.

Referring to FIG. 5, the frame conversion circuit 530 is coupled with the decoding circuit 510 and the decision circuit 520, and is configured to generate a conversion frame $F_T$ according to $F_{EARLY}$ and 3D_Index when the decision result DET indicates that the compressed data of the input frame $F_{IN}$ includes 3D_Index. For example, 3D_Index indicates at least one of the following: the Z-axis angle conversion which is applicable in some circumstance such as a circumstance of a vehicle turning right/left or going uphill/downhill; a zoom-in/zoom-out conversion which is applicable in some circumstance such as a circumstance of a vehicle going forward/backward; and a rotation conversion. Accordingly, the frame conversion circuit 530 processes $F_{EARLY}$ according to 3D_Index to generate the conversion frame $F_T$ similar to $F_{LATE}$. It is noted that when the decision result DET indicates that the compressed data of the input frame $F_{IN}$ does not include 3D_Index, the frame conversion circuit 530 does not generate the conversion frame $F_T$, but the implementation of the present invention is not limited thereto.

Referring to FIG. 5, the reconstruction circuit 540 is configured to reconstruct $F_{LATE}$ according to the conversion frame $F_T$ and the compressed data of $F_{LATE}$ (e.g., data including motion vector data and residual-difference data generated based on the comparison between $F_{EARLY\_K}$ and $F_{LATE}$) after the frame conversion circuit 530 generates the conversion frame $F_T$. For example, the reconstruction circuit 540 refers to motion vectors obtained from the compressed data of $F_{LATE}$ first to find out image blocks of the conversion frame $F_T$ relevant to the motion vectors, then puts the image blocks on the corresponding areas of a transitional $F_{LATE}$, and then adds the residual-difference obtained from the compressed data of $F_{LATE}$ to the transitional $F_{LATE}$ to reconstruct $F_{LATE}$.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible based on the present disclosure.

To sum up, the video encoder and the video decoder of the present disclosure can take the variations in the third-dimensional parts of video frames into consideration and thereby greatly reduce the size of a bitstream (i.e., data of coded frames). As to the additional calculation caused by the introduction of third-dimensional factors, the calculation can be simplified with the forecast of third-dimensional motion provided by external computing resources such as the electronic control unit (ECU) of a vehicle, the remote controller of an unmanned flying vehicle, etc., which means exhaustive calculation is not necessary.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A video encoder configured to determine how to generate compressed data of a late frame according to a three-dimensional (3D) difference between an early frame and the late frame, the video encoder comprising:
   a decision circuit configured to generate a decision result according to the 3D difference between the early frame and the late frame; and
   an encoding circuit configured to perform a 3D compression process to the late frame when the decision result indicates that the 3D difference satisfies a predetermined condition, and configured to perform a routine compression process to the late frame when the 3D difference does not satisfy the predetermined condition,
   wherein the early frame and the late frame are two frames of successive video frames.

2. The video encoder of claim 1, wherein the decision circuit includes a truth table, a two-dimensional (2D) difference comparison circuit, and a 3D difference comparison circuit, and the decision circuit is configured to use the truth table to determine whether to perform a 2D difference comparison process and/or a 3D difference comparison process.

3. The video encoder of claim 2, wherein the 2D difference comparison circuit includes:
   a comparison circuit configured to perform the 2D difference comparison process according to the early frame and the late frame and thereby obtain a 2D difference; and
   a threshold circuit configured to determine whether the 2D difference satisfies a similarity threshold and thereby generate a similarity decision result.

4. The video encoder of claim 3, wherein the decision circuit generates a third-dimensional difference in conjunction with the encoding circuit, and the 3D difference comparison circuit includes:
   another threshold circuit configured to determine whether the third-dimensional difference satisfies a third-dimensional variation threshold after the 2D difference satisfies the similarity threshold, and thereby generate the decision result.

5. The video encoder of claim 1, wherein the encoding circuit is configured to generate index data to instruct how to process the early frame to generate a conversion frame analogous to the late frame, and is configured to let the index data be included in compressed data of the early frame or the compressed data of the late frame.

6. The video encoder of claim 1, wherein the encoding circuit includes:
   a frame conversion circuit configured to perform N type(s) of third-dimensional conversion to the early frame and thereby generate N candidate frame(s), wherein the N is a positive integer;
   a calculation and comparison circuit configured to compare each of the N candidate frame(s) with the late frame to find out which frame of the N candidate frame(s) analogous to a conversion frame originated from the late frame, and thereby generate conversion guidance;
   an index generation circuit configured to generate index data according to the conversion guidance; and
   a forecast circuit configured to provide a conversion suggestion for the frame conversion circuit to accelerate generation of one of the N candidate frame(s) analogous to the conversion frame.

7. The video encoder of claim 6, wherein any of the N type(s) of third-dimensional conversion includes one of the following: a Z-axis angle conversion; a zoom-in/zoom-out conversion; a rotation conversion; and a combination of at least two of the Z-axis angle conversion, the zoom-in/zoom-out conversion, and the rotation conversion.

8. The video encoder of claim 6, wherein the encoding circuit is configured to obtain a remaining difference between a candidate frame of the N candidate frame(s) and the late frame through calculation and comparison, and when the remaining difference falls within a predetermined range, the encoding circuit is configured to choose the candidate frame as the conversion frame.

9. The video encoder of claim 6, wherein the encoding circuit is configured to call an encoder to perform a video compression process to a candidate frame of the N candidate frame(s) through calculation and comparison, and when a code size of a result of the video compression process falls within a predetermined range, the encoding circuit is configured to choose the candidate frame as the conversion frame.

10. The video encoder of claim 6, wherein the forecast circuit is configured to provide the conversion suggestion based on information of a vehicle, and the information includes at least one of the following: a cruise speed; an uphill angle; a downhill angle; a steering angle of a steering wheel; and a roll angle.

11. The video encoder of claim 6, wherein the conversion suggestion is from a remote control device.

12. The video encoder of claim 6, wherein the index data are included in a field of user data of a conventional coded video bitstream or an extension field of the conventional coded video bitstream.

13. The video encoder of claim 1, wherein the early frame and the late frame are consecutive frames of the successive video frames.

14. The video encoder of claim 1, wherein the early frame and the late frame are inconsecutive frames of the successive video frames.

15. The video encoder of claim 1, wherein the early frame is an image object of an early video frame, and the late frame is a corresponding image object of a late video frame.

16. The video encoder of claim 1, wherein the video encoder is applied to a driving recorder.

17. The video encoder of claim 1, wherein the video encoder is applied to an unmanned flying vehicle.

18. A video decoder configured to determine whether compressed data of an input frame include three-dimensional (3D) index data and accordingly determine how to generate a late frame, wherein:
   the input frame is an early frame or a reconstructed frame;
   the video decoder includes a decoding circuit, a decision circuit, a frame conversion circuit, and a reconstruction circuit;
   the decoding circuit is configured to decompress compressed data of the early frame to generate the early frame, or configured to use a previous frame previously generated by the video decoder as the early frame;
   the decision circuit is configured to determine whether the compressed data of the input frame includes the 3D index data and accordingly generate a decision result;
   the frame conversion circuit is coupled with the decoding circuit and the decision circuit, and is configured to generate a conversion frame according to the early frame and the 3D index data responsive to the decision result indicating that the compressed data of the input frame includes the 3D index data;
   the reconstruction circuit is configured to reconstruct the late frame according to the conversion frame and compressed data of the late frame after the frame conversion circuit generates the conversion frame; and
   responsive to the decision result indicating that the compressed data of the input frame does not include 3D index data, the video decoder performs a routine decompression process to generate the late frame.

19. The video decoder of claim 18, wherein when the decision result indicates that the compressed data of the input frame does not include the 3D index data, the frame conversion circuit does not generate the conversion frame.

20. The video decoder of claim 18, wherein the 3D index data indicates at least one of the following: the Z-axis angle conversion; a zoom-in/zoom-out conversion; and a rotation conversion.

* * * * *